United States Patent
Renard et al.

(10) Patent No.: US 10,686,693 B2
(45) Date of Patent: Jun. 16, 2020

(54) METHOD AND SYSTEM FOR OPTIMIZED ROUTING OF DATA STREAMS IN TELECOMMUNICATION NETWORKS

(71) Applicant: BARCO NV, Kortrijk (BE)

(72) Inventors: Gauthier Renard, Oudenaarde (BE); Kristof Demeyere, Roeselare (BE)

(73) Assignee: BARCO NV, Kortrijk (BE)

( * ) Notice: Subject to any disclaimer, the term of this patent is extended or adjusted under 35 U.S.C. 154(b) by 0 days.

(21) Appl. No.: 15/772,240

(22) PCT Filed: Oct. 20, 2016

(86) PCT No.: PCT/EP2016/075192
§ 371 (c)(1),
(2) Date: Apr. 30, 2018

(87) PCT Pub. No.: WO2017/076652
PCT Pub. Date: May 11, 2017

(65) Prior Publication Data
US 2018/0316600 A1 Nov. 1, 2018

(30) Foreign Application Priority Data
Nov. 3, 2015 (GB) .................................. 1519379.0

(51) Int. Cl.
*H04L 12/721* (2013.01)
*H04L 12/729* (2013.01)
(Continued)

(52) U.S. Cl.
CPC ............ *H04L 45/123* (2013.01); *H04L 12/56* (2013.01); *H04L 45/028* (2013.01);
(Continued)

(58) Field of Classification Search
None
See application file for complete search history.

(56) References Cited

U.S. PATENT DOCUMENTS 6,981,055 B1   12/2005   Ahuja et al.
8,064,432 B2 *  11/2011   O'Neil .................... G06N 3/126
                                                          370/351
(Continued)

OTHER PUBLICATIONS

International Search Report for PCT/EP2016/075192 dated Jan. 30, 2017.
(Continued)

*Primary Examiner* — Mohammad S Adhami
(74) *Attorney, Agent, or Firm* — Bacon & Thomas, PLLC

(57) ABSTRACT

A method, system and a network element for routing at least one data stream in a telecommunications network, the network having at least one transmitting node providing at least one data stream, at least one receiving node receiving the at least one data stream, and zero or more processing nodes, and at least one link connecting said nodes. All nodes communicate their capabilities to a system database on a database server which receives at least one request with at least one condition for sending at least one data stream between two nodes. For or each request, a measure is calculated for at least one route between said two nodes, and instructions are provided to use only the at least one route having measures compliant with the at least one condition in the request. An optimal route can be determined using at least one heuristic rule or linear programming.

21 Claims, 9 Drawing Sheets

(51) Int. Cl.
  *H04L 29/06*     (2006.01)
  *H04L 12/54*     (2013.01)
  *H04L 12/717*    (2013.01)
  *H04L 12/759*    (2013.01)
  *H04L 12/707*    (2013.01)
  *H04L 12/26*     (2006.01)

(52) U.S. Cl.
  CPC .......... *H04L 45/124* (2013.01); *H04L 45/125* (2013.01); *H04L 45/127* (2013.01); *H04L 45/14* (2013.01); *H04L 45/22* (2013.01); *H04L 45/42* (2013.01); *H04L 69/24* (2013.01); *H04L 43/08* (2013.01)

(56) References Cited

U.S. PATENT DOCUMENTS

| | | | |
|---|---|---|---|
| 8,289,365 | B2 | 10/2012 | De Lind Van Wijngaarden et al. |
| 9,043,453 | B1 | 5/2015 | Kielhofner et al. |
| 2006/0107089 | A1 | 5/2006 | Jansz et al. |
| 2007/0280117 | A1* | 12/2007 | Katz ....................... H04L 41/00 370/238 |
| 2009/0245114 | A1 | 10/2009 | Vijayaraghavan |
| 2010/0245534 | A1 | 9/2010 | De Lind Van Wijngaarden et al. |
| 2011/0205919 | A1 | 8/2011 | Imai |
| 2013/0034105 | A1 | 2/2013 | Wall |
| 2014/0098685 | A1 | 4/2014 | Shattil |
| 2015/0128223 | A1* | 5/2015 | Magri ..................... H04L 45/42 726/4 |
| 2015/0244578 | A1 | 8/2015 | Grosso et al. |
| 2015/0326439 | A1* | 11/2015 | Smith ................. H04L 12/6418 370/254 |
| 2018/0367584 | A1* | 12/2018 | Shi ........................ G06F 9/5083 |

OTHER PUBLICATIONS

Written Opinion for PCT/EP2016/075192 dated Jan. 30, 2017.
International Preliminary Report on Patentability for PCT/EP2016/075192 dated Nov. 7, 2017.
Search Report for corresponding British application GB1519379.0 dated Jul. 5, 2016.
Further Search Report for corresponding British application GB1519379.0 dated Mar. 7, 2017.
European Office Action in related European Application No. 16790910.0-1215, dated Feb. 22, 2019.
Examination Report in corresponding Singapore Application No. 11201803608T, dated May 29, 2019.
European Office Action in related European Application No. 16790910.0-1215, dated Oct. 8, 2019.

* cited by examiner

METHOD AND SYSTEM FOR OPTIMIZED ROUTING OF DATA STREAMS IN TELECOMMUNICATION NETWORKS

The present invention relates to a method of dynamic routing of data streams over telecommunication networks as well as to a telecommunication network providing dynamic routing, and to a routing device able to perform calculations for dynamic routing and to computer programs and software for implementing the dynamic routing.

BACKGROUND

In data networking, dynamic routing is a way to send data, e.g. data streams from a source/transmitting node to a destination/receiving node by taking into account changes in the network during transmission. If the data stream is sent over different types of networks, e.g. Private Networks, Wide Area Networks (WAN) or Cloud Backbones, firewalls between the different networks can make the transmission more complicated. Further parameters to consider can be e.g. the use of different protocols or that a composition of a multiple of streams is required. The challenge is to deploy processing and forwarding units in the nodes of the data network so that maximum quality to cost can be achieved when sending streams over the network. In the case of live streams, where possible allowed delays are less than about 50 ms, it's even more important that the network can handle a broken line without disturbing the transmission. Live streams are used for example in applications which require voice transmissions such as in conferencing or collaboration contexts.

Current conferencing or collaboration solutions are usually implemented using peer-to-peer or peer-to-server. Most of them solve the case where one transmitter sends to many receivers by using Multipoint Control Units (MCU's). Additional processing power might be added in these MCU's (e.g. transcoding, composition, transrating or resizing) but the data streams are usually routed through pre-defined fixed nodes that have fixed locations in the network. The data stream will normally enter or exit such systems at the server closest to the destination point. And possible optimization of the routes (and the processing) is obtained through pre-defined and fixed rules. These solutions are limited to processing multimedia data. So-called "content providers" (e.g. video-on-demand) often need to route between different types of networks and over large distances, but they have no requirement to work with live streams. On the other hand they can buffer the data streams for "long times", e.g. several minutes, before starting the transmission. And if later on re-routing is needed, this can be performed within the buffer time interval without the end-user noticing U.S. Pat. No. 6,981,055B1 describes how to optimize routing in a network of border gateways through multiple internet route providers. The method comprises making routing decisions based on performance measurements associated with a plurality of alternative paths. Re-routing is performed by using the last received routing table.

SUMMARY OF THE INVENTION

In one aspect of the present invention a method such as a computer-implemented method, is provided for routing at least one data stream in a telecommunications network having at least one transmitting node providing at least one data stream, at least one receiving node receiving the at least one data stream, and zero or more processing nodes, and at least one link connecting said nodes, the method comprising the steps of:

all nodes communicating their capabilities to a system database on a database server, e.g. all active nodes or all potentially active nodes communicate their capabilities, the database server receiving at least one request with at least one condition for sending at least one data stream between two nodes, and for each request, using the capabilities of all nodes and links stored in a single source or central database at the time of receiving the request, to calculate a measure for at least one route between said two nodes, each route comprising at least one transmitting node, at least one receiving node and zero or more processing nodes, and providing instructions to use only the at least one route having measures compliant with the at least one condition in the request.

This has the advantage that the stream is sent over a network, taking account the state of the network at the time of sending the stream(s), and also sending the stream(s) only over the calculated route(s).

The method can include calculating an optimal route using at least one heuristic rule or linear programming. An advantage of embodiments of the present invention is that an optimal route can be calculated.

For each direct pair of stateful nodes, hops between them can be replaced with a direct link. Then a route cost can be calculated, and if the route cost is lowered and the required processing power is still provided, the direct link can be kept. This avoids making unnecessary changes. An advantage of a direct link between stateful nodes is that no other stateful nodes can be located in between, while other type of nodes, e.g. a relay node, can. This means that this step will never remove processing power, so the request will always be fulfilled.

In another step, for each direct pair of stateful nodes, all links between the two nodes can be removed and, considering the required processing power, the shortest path can be added according to one of the Dijkstra algorithm, the Bellman/Ford algorithm; and the Johnson's algorithm. This provides a good optimisation.

Also at least one node with processing power can be added or removed, followed by calculating a route cost. If the route cost is lower and the required processing power is still provided, the direct link can be kept.

In accordance with any of the embodiments of the present invention, the route cost can be monetary cost or latency cost.

It is advantageous to model the network with an objective function and use the request to define boundary conditions of the variables in the model, and then minimize or maximize the objective function. There are several mathematical techniques which allow optimization when an objective function with constraints has been defined. For example, the model can comprise variables for at least one processing type and/or at least one window. For example, the variables can be binary.

It is advantageous if each variable has an index counter giving each specific component in the network a unique variable.

For example, each processing step in the model can be associated with a weight variable.

The model will be limited by constraints provided in the request, for example cost and/or latency. For example the model can be limited by actual properties of the network, for example receiving and transmitting bandwidth and/or encoding and decoding capacity.

Therefore, the objective function can be minimized or maximized within the limits of variable constraints.

A solution can be found by using linear programming, for example.

It is also possible to request to send at least two data streams from at least two different transmitting nodes.

At least two of the network nodes can use different protocols. For example, at least two of the network nodes of the calculated route can be using different protocols.

To be flexible network, nodes, or a combination of both, can be added or removed between two events in the network.

In an embodiment of the present invention, at least one data stream can be sent via a perimeter network or by means of Transmission Control Protocol tunnelling.

The method can include requesting to send at least one data stream from at least one transmitting node to at least one receiving node in a processed format, calculating the optimal location of a processing node in relation to the transmitting node or the receiving node, sending the at least one data stream to the optimal node for processing, and sending the processed data stream to the at least one receiving node, possibly via another processing node. This has the advantage of finding the best place for processing the request.

An example of processing to be carried out can be compositing, transcoding, scaling, re-packaging, relaying, tunnelling or transrating or any combination thereof.

To be able to adapt link settings for optimized data delivery, for each of the at least one calculated route, the settings of the at least one link can be modified before sending the at least one data stream along the calculated route.

For re-routing a data stream, the steps of the network can be submitted to an event which triggers engagement of the above method.

The at least one single source or central server can use the communicated capabilities of nodes to create an empirical model of each node and associated link. The advantage is that the single source or central server learns from monitoring data For any of the embodiments of the present invention, the request condition can comprise any of latency, cost, computation time, quality of the data stream, frame rate, accepted loss rate, the priority of a data stream or any combination thereof. This has the advantage of allowing a number of conditions which can be included in a request.

In another aspect a system is provided for carrying out any of the method steps mentioned above.

In yet another aspect of the present invention a system is provided such as a computer-implemented system for routing at least one data stream in a telecommunications network comprising at least one transmitting node, at least one receiving node and zero or more processing nodes, and at least one link connecting said nodes, further comprising at least one single source or central server being connected to all nodes, via clients, over a second network, wherein for each point in time, the capability of each node and link is stored on the single source or central server, so that for each point in time, each route through the network is associated with a measure calculated from the capability of each node and link belonging to said route. The server preferably always communicates with the nodes via a client.

An advantage of this is that each route has a certain measure at each point in time. For example, a measure can be any of latency, cost, computation time, quality of the data stream, frame rate, accepted loss rate, the priority of a data stream or any combination thereof.

For each point in time, there is an optimal route for one measure or for any combination of a multiple of measures. Thus a suitable optimised route can be found based on one or more measures For example, a route can comprise a perimeter network or Transmission Control Protocol Tunnelling. This allows a possible route to be using DMZ or TCP tunnelling.

To allow flexibility, at least two network nodes can be implemented with different protocols.

A calculated route can comprise at least two network nodes that are implemented with different protocols. This allows different protocols in final routes.

A processing node can be provided with processing power to carry out any, some or all of the functions of at least one transcoder, at least one compositor, at least one relay, at least one scaler, at least one re-packaging function, or any combination thereof. Additionally, a processing node can be adapted to perform other functions. Some of these functions can be unknown to the system e.g. because they are application specific e.g. face detection, recording, license plate recognition).

A pre-set measure can be assigned to at least one link of a route. This has the advantage of adapting link settings for optimized data delivery.

To allow flexible solutions, the capabilities of any, some or all of the nodes before an event in the network occurs can be different form said capabilities after the event has occurred and/or the route of a stream before an event in the network occurred can be different from the route after the event has occurred.

The single source or central server can keep samplings of capabilities of nodes at different points in time.

The network can be an overlay network with each node being implemented on one or several instances of at least one virtual machine.

The database server can comprise a system database, nosQL database, a knowledge database, a data collector a data query, application modules and a communication bus.

As explained above, according to aspect of the present invention, each request can use the capabilities of all nodes and links at the time of the request to calculate (and optimize) a route, thus also for the case when a new route is requested. The present invention relates to not only the case when all nodes are border gateways and hence do more or less the same type of work but also for embodiments of the present invention there can be different processing requirements, and rerouting to another node has to be calculated and optimized.

Also in accordance with another aspect of embodiments of the present invention nodes (such as border gateways) report their capabilities to a database. Reported capabilities can include processing capabilities such as e.g. compositing or transcoding.

Due to the added processing power in accordance with embodiments of the present invention, the optimization can be more complex and can handle a network with nodes having different capabilities.

Additionally this can be performed for "live streams" with a short delay such as less than 800 ms or less than 50 ms, such as down from 500 ms down to 30 ms. For example, service providers (e.g. video on demand or broadcast) can perform the rerouting during a buffer margin of up to several minutes. A user may be tolerant with respect to receiving the data immediately after it has sent been sent. However, embodiments of the present invention can be used in a conferencing situation with which re-routing has to happen very rapidly, e.g. immediately and still with fulfill requirements on composition, transcoding, latency, etc.

Hence in embodiments of the present invention, a unique route is calculated for each data stream so that a data stream can be sent. This route can be updated when there is an event in the network. Embodiments of the present invention allow to optimize this calculated route.

For example, embodiments pf the present invention provide a method for optimizing, e.g. by using linear programming, which can be used in a method of routing data streams whereby computational power can be provided from a server such as a single source or central server.

In embodiments of the present invention route optimizing can be performed by dividing bandwidth unevenly between the streams but in such a manner that they exhibit the same quality for each stream. This relies on allocating bandwidth depending upon the data stream and taking into account different requirements for different types of data stream, e.g. more bandwidth can be allocated to video than to static image content.

In another aspect of the present invention a network element is provided such as a computer-implemented network element for carrying out any of the methods of the present invention. For example this network element can be an application server. The network element is adapted, for example, for calculating the routing of at least one data stream in a telecommunications network, the network having at least one transmitting node providing at least one data stream, at least one receiving node receiving the at least one data stream, zero or more processing nodes, and at least one link connecting said nodes, the network element having at least access to a database server,
all nodes communicating their capabilities to a system database on the database server,
the database server receiving at least one request with at least one condition for sending at least one data stream between two nodes,
and for each request, the network element is adapted to use the capabilities of all nodes and links stored in a single source or central database at the time of receiving the request, to calculate a measure for at least one route between said two nodes, each route comprising at least one transmitting node, at least one receiving node and zero or more processing nodes, and providing instructions to use only the at least one route having measures compliant with the at least one condition in the request.

The network element can include one or more microprocessors, processors, controllers, or a central processing unit (CPU) and/or a Graphics Processing Unit (GPU), and can be adapted to carry out functions by being programmed with software, i.e. one or more computer programmes. The network may have memory (such as non-transitory computer readable medium, RAM and/or ROM), an operating system, optionally a display such as a fixed format display, data entry devices such as a keyboard, a pointer device such as a "mouse", serial or parallel ports to communicate with other devices, or network cards and connections to connect to any of the networks.

The network element can be adapted to calculate an optimal route using at least one heuristic rule or linear programming.

For each direct pair of stateful nodes, the network element can replace hops between them with a direct link. Then a route cost can be calculated, and if the route cost is lowered and the required processing power is still provided, the direct link can be kept. This avoids making unnecessary changes.

In another step, for each direct pair of stateful nodes, the network element can be adapted to remove all links between the two nodes and, considering the required processing power, the shortest path can be added according to one of the Dijkstra algorithm, the Bellman/Ford algorithm; and the Johnson's algorithm. This provides a good optimisation.

Also at least one node with processing power can be added or removed, followed by calculating a route cost. If the route cost is lower and the required processing power is still provided, the direct link can be kept.

It is advantageous if the network element has a model of the network using an objective function and the network element is adapted to use the request to define boundary conditions of the variables in the model, and then minimize or maximize the objective function. There are several mathematical techniques which allow optimization when an objective function with constraints has been defined. For example, the model can comprise variables for at least one processing type and/or at least one window. For example, the variables can be binary.

It is advantageous if each variable has an index counter giving each specific component in the network a unique variable.

For example, each processing step in the model used by the network element can be associated with a weight variable.

The model will be limited by constraints provided in the request, for example cost and/or latency. For example the model can be limited by actual properties of the network, for example receiving and transmitting bandwidth and/or encoding and decoding capacity.

Therefore, the objective function can be minimized or maximized within the limits of variable constraints.

A solution can be found by using linear programming, for example.

It is also possible for the network element to be adapted to request to send at least two data streams from at least two different transmitting nodes.

At least two of the network nodes can use different protocols. For example, at least two of the network nodes of the calculated route can be using different protocols.

To be flexible network nodes, or a combination of both, can be added or removed between two events in the network.

For example, at least one data stream can be sent via a perimeter network or by means of Transmission Control Protocol tunnelling.

The network element can be adapted to include requesting to send at least one data stream from at least one transmitting node to at least one receiving node in a processed format, to calculate the optimal location of a processing node in relation to the transmitting node or the receiving node, to send the at least one data stream to the optimal node for processing, and to send the processed data stream to the at least one receiving node, possibly via another processing node. This has the advantage of finding the best place for processing the request.

An example of processing to be carried out can be compositing, transcoding, scaling, re-packaging, relaying, tunnelling or transrating or any combination thereof.

To be able to adapt link settings for optimized data delivery, for each of the at least one calculated route, the settings of the at least one link can be modified before sending the at least one data stream along the calculated route.

For re-routing a data stream, the steps of the network can be submitted to an event which triggers engagement of the above method.

The network element can use the at least one single source or central server for communicating capabilities of nodes to create an empirical model of each node and associated link. The advantage is that the single source or central server learns from monitoring data.

In another aspect of the present invention software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid state memory such as a USB flash memory, a ROM, etc.

DEFINITIONS

Figure 1:
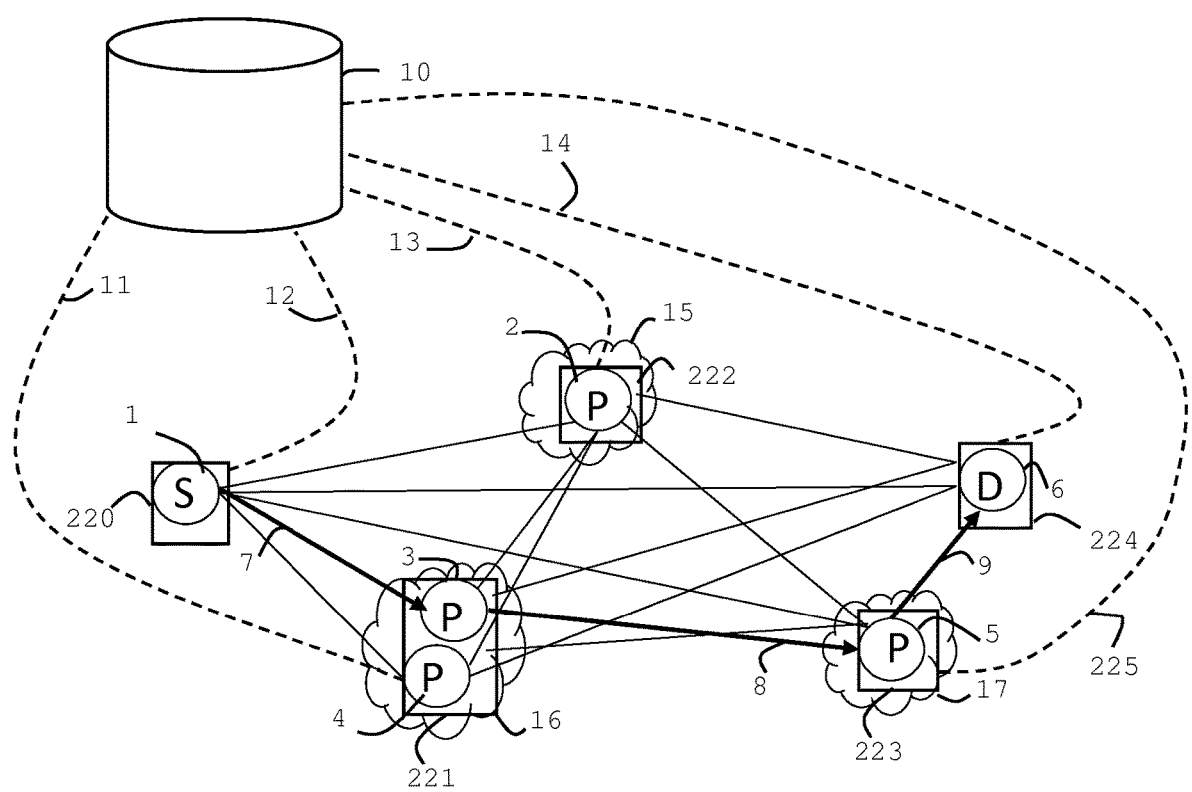
FIG. 1 shows an embodiment of the present invention comprising different nodes of a network, connected via clients, to an application server.

In the following text a "data stream" can comprise data including any one of, any combination of, or all of text, video, audio, metadata files or any digitized data that can be sent between- and be processed by nodes in a network. The data stream can include packets or frames with, for example, headers or preambles, mid-ambles or post-ambles, error checking data or error correction data.

A "hybrid network" can comprise communication with different communication technology, such as e.g. wired and wireless connections. A hybrid network comprising different networks may need a conversion of a data stream from one network to another. Hence, the hybrid network can comprise one or some or all of e.g. Private Networks, Wide Area Networks (WAN) or Cloud Backbones.

A "hop" is a part of the path that a packet, frame or stream takes when going from a source node to a destination node. When performing the hop, the packet or stream passes a network element such as e.g. a router, gateway, processing node, etc. Nodes can be configured as repeaters.

"Network elements" such as e.g. servers such as application servers, database servers, routers, gateways, processing nodes, repeaters, encoders, decoders, transcoders, encrypters and/or decrypters, compositors, modems, transrating or resizing devices, protocol converters, buffers, etc can be devices which have a processing engine such as a microprocessor or an FPGA and also memory or are constructed as a microcontroller or comprise software which can be executed to create the relevant functionality such that digital information can be processed. Such network elements can have a network interface such as a network card which allows each of these network elements to interact with the network. Network elements may comprise logic encoded in media for performing any kind of information processing. Logic may comprise logic gates or software encoded in a disk or other computer-readable medium and/or instructions encoded in an application specific integrated circuit (ASIC), field programmable gate array (FPGA), or other processor or hardware.

It is advantageous to use a "single source server" for storing some information whose duplication would require synchronisation that could cause problems if the synchronisation is delayed. Such a single source server can be implemented as a central server.

A "link" is a communication channel between two nodes in the network.

A "stateful node" can remember one or more preceding events in a system where interactions (e.g. with a user, with an application) occur. A "direct pair" of stateful nodes has no other stateful nodes in the link between them.

A "client" is referred to as a piece of software that can run on any type of computer (e.g. laptop, desktop, tablet, phone, . . . ) or is a physical digital processing device which communicates with a server and can sometimes interact with a user. It can host one or more types of nodes, e.g. source nodes, destination nodes and/or processing nodes. There are various types of client-server schemes such as a thin client, a thick client etc. which differ with respect to the level of intelligence and independence of the client device.

"Applications" are computer programs or software that can run on either a server, or on clients that might be hosting the nodes. An application can start a stream between two nodes by submitting a request to the application server with information on the stream, together with requirements for how it should be sent and received. The nodes will use the network to send the stream to other nodes.

Alternatively, the client can request a stream that is hosted on another client.

"Codecs" and "transport protocols": with reference to audio/video: there can be any combination of video codec (and/or audio codec) and transport protocol:
  Video Codecs: MJPEG, h.263, h.264 (=AVC), h.265 (=HEVC), VP8, VP9, VMW, . . . .
  Audio Codecs: mp3, flac, ogg vorbis, WAV, AAC, . . . .
  Transport protocols: WebRTC, RTP, RTSP, DASH, HLS, RTMP, MirrorOp, . . . .

In case of other data, JSON over websockets, xml over http, . . . and many more combinations are available.

ABBREVIATIONS

MJPEG, Motion JPE (JPEG: Joint Photographic Experts Group)
H.263,
H.264 (=AVC), AVC=Advanced Video Coding
H.265 (=HEVC), HEVC=High Efficiency Video Coding
VP8,
VP9,
VMW Windows Media Video
mp3, MPEG Layer-3 (MPEG: Motion Picture Experts Group)
flac, Free Lossless Audio CODEC
vorbis,
WAV, WAVE
AAC Advanced Audio Coding
WebRTC, Web Real Time Communications
RTP, Real-time Transport Protocol
RTSP, Real Time Streaming Protocol
DASH, Dynamic Adaptive Streaming over HTTP
HLS, HTTP Live Streaming
RTMP, Real Time Messaging Protocol
MirrorOp Mirror+Operate (app for WePresent)

DETAILED DESCRIPTION OF THE INVENTION

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

FIG. 1 shows an embodiment of the invention comprising a electronic digital telecommunication network with a transmitting source node 1, four processing nodes 2, 3, 4 and 5, and one receiving destination node 6. The nodes are hosted by different clients and located at different clouds. Figure shows different clients (squares) 220, 221, 222, 223 and 224 and a connection 225 to the single source or central server. The source node 1 is a local node hosted by client 220, node 2 is hosted by client 222 and located at cloud 15, node 3 and node 4 are hosted by client 221 and located at cloud 16, node 5 is hosted by client 223 and located at cloud 17 and the destination node 6 is a local node hosted by client 224. The task is to set up a link between the source node 1 and the destination node 6 for sending data. FIG. 1 shows that there are various alternatives for how to accomplish this in the connecting lines between the nodes. A certain route comprising links 7, 8 and 9 is finally selected. Embodiments of the present invention are adapted so that the transmission is able to fulfil certain requirements taking into account the current status of the network and its links. The requirements could be for example a maximum amount of latency, a minimum level of quality. In case there is a multiple of streams, there might be composition needed, etc.

The nodes of a hybrid network may be distributed within one region, one country, one continent or worldwide in different types of networks, such as e.g. Private Networks, Wide Area Networks (WAN) or Cloud Backbones. The nodes are implemented as stand-alone devices or by one or several instances of virtual machines on physical servers of the cloud provider. There can be an arbitrary number of nodes for each virtual machine. All nodes are connected to an application server 10 over the networks 11, 12, 13, 14 and via a network link 225 which can be separate or connected to each other. The application server 10 is continuously receiving information from each node about its capability, thus the application server 10 is implementing a monitoring function that monitors the state of the hybrid network at each point in time. In one embodiment information can also be gathered non-continuously and upon request. For example, one request could be that there is a bandwidth test started periodically (e.g. once per hour or with any interval of preference). In another example, if a new node is added to the network, a request could be launched to test e.g. its network capabilities and/or connectivity status (for example testing a firewall) to see if it could be used for connection in the future.

There can be events in the network, i.e. actions that affect the network thus changing its status. For example a broken link can appear or a channel can suddenly be heavily loaded so that the bandwidth is drastically reduced. If necessary, the single source or central server can add or remove nodes from a path in the network to increase efficiency and assure quality of service. The introduction or removal of a node is also an event.

A data stream originates from a source node, which can also act as a transmitting node, and is received at its final destination by a destination node, which also acts as a receiving node. A processing node can share a physical device with the source node(s) or the destination node(s), or it can be located as a separate node between the source node(s) and the destination node(s). A processing node has computation power to apply to the stream(s) various functions. These could be for example compositing, transcoding, . . . . Additionally, a processing node can be configured to perform other functions. Some of these can be unknown to the system, e.g. because they are application specific e.g. face detection, recording, license plate recognition.

The processing node(s) can also act as transmitting and receiving nodes. In case there is an event, e.g. a broken link, the network status has changed and the route calculated before might no longer be valid. In such a situation, a network element such as the application server calculates a new route which may or may not use the processing node currently hosting the stream, as a transmitting node. The network element such as an application server for doing calculations relevant to rerouting can include one or more microprocessors, processors, controllers, or a central processing unit (CPU) and/or a Graphics Processing Unit (GPU), and can be adapted to carry out functions by being programmed with software, i.e. one or more computer programmes.

The network may have memory (such as non-transitory computer readable medium, RAM and/or ROM), an operating system, optionally a display such as a fixed format display, data entry devices such as a keyboard, a pointer device such as a "mouse", serial or parallel ports to communicate with other devices, or network cards and connections to connect to any of the networks. The application server can consult a mix of static and dynamic knowledge on the network to find acceptable, good or better routes, e.g. "correct" routes. Static knowledge can e.g. be entered by the system administrator, for example to use gateway "x" for streaming to any destination inside a certain company network. Dynamic knowledge is knowledge added to the system by learning from previous decisions.

The calculation of the route can be optimized, taking into account any, some or all of the conditions in the request, characteristics of the data to be sent and the current capabilities and/or current measured state of the network nodes. For example, if a link has full capacity of 1 Gbit per second, and 50% is used by other applications, the current measured state would be that only 500 Mbit per second can be used.

Figure 2:
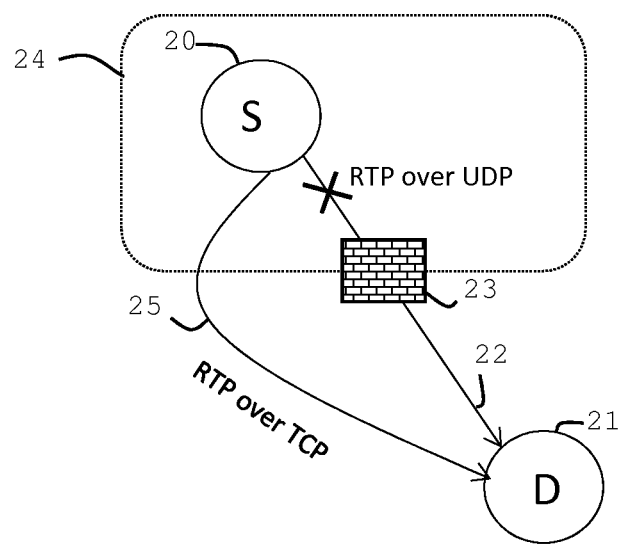
FIG. 2 shows an embodiment of the present invention comprising a firewall blocking a link.

FIG. 2 shows an embodiment of the present invention comprising a source node 20 and a destination node 21. The direct UDP (User Datagram Protocol) link 22 between them is blocked by a firewall 23 at the border of network 24. However, both devices are able to tunnel RTP over TCP, so the application server can select to do so over links 25 instead of selecting routing over a processing node.

Figure 3:
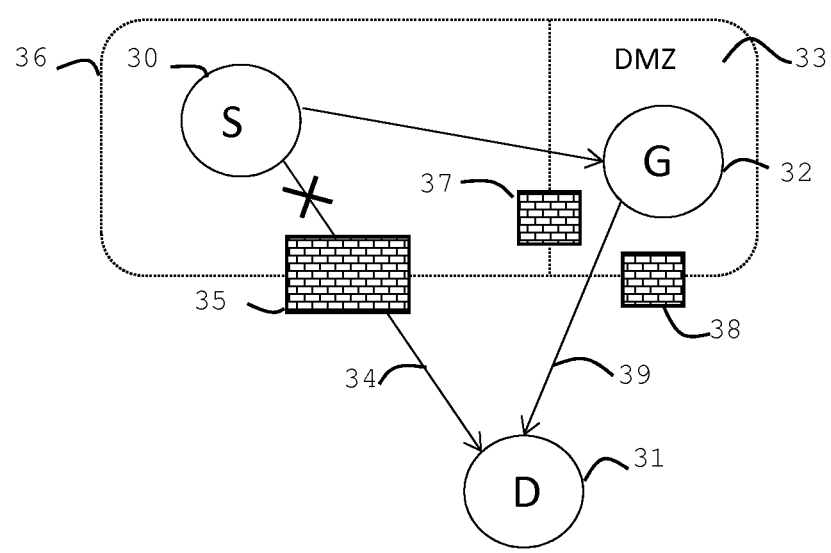
FIG. 3 shows an embodiment of the present invention comprising the use of a DMZ.

FIG. 3 shows an embodiment of a network according to the present invention having a source node 30 located in a network 36, a destination node 31 and a gateway node 32 in a perimeter network, or DMZ (Demilitarized Zone) 33. The direct link 34 between the source node 30 and the destination node 31 is blocked by a firewall 35. However, the perimeter network 33 comprises a gateway node 32, and the stream can be re-routed via the gateway node 32 and further to the destination node 31 via link 39. The gateway node 32 is also limited by firewalls 37 and 38, but they can for example be configured not to block the streams from this gateway personal computer. An alternative is that the gateway node 32 has a network interface to the network behind the firewall and a network interface to the network not behind the firewall (not shown).

Figure 4:
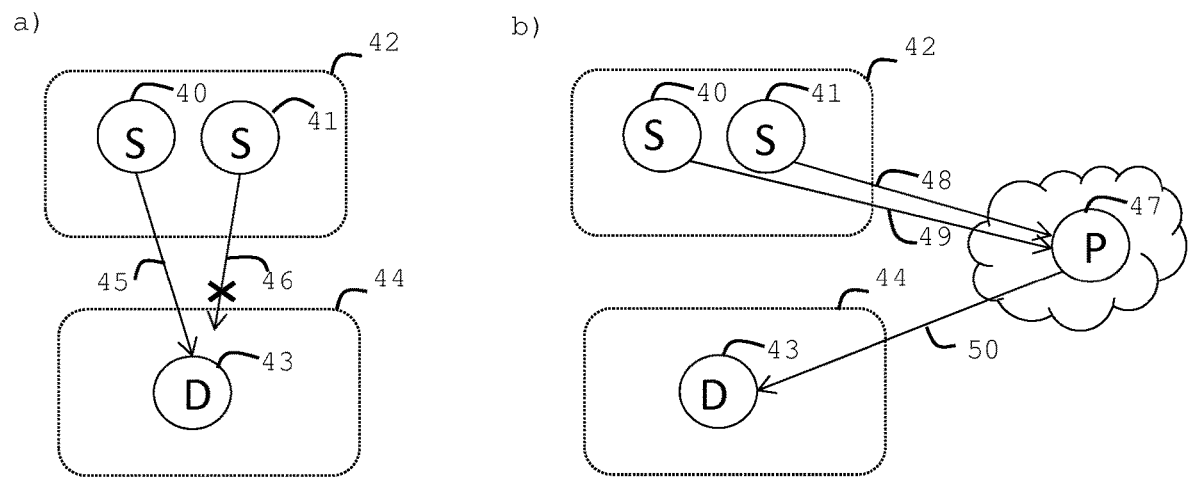
FIG. 4 shows an embodiment of the present invention comprising rerouting via a node.

In one embodiment, a multiple of streams are to be sent over the network. FIG. 4a) shows how 2 streams from nodes 40 and 41 in network 42 are requested to be sent to node 43 in network 44. The direct routes would be 45 and 46. However, node 43 might not be able to receive one of the streams over one of the routes, e.g. route 46. For example, the destination node 43 might not have the processing power (for e.g. decoding and/or compositing, or any other function(s) needed), or there could be a line breakdown or there could be a firewall present. FIG. 4b) shows how the application server re-routes both streams to node 47 over routes 48 and 49. The streams are processed at node 47 and the resulting one stream 50 can now be sent to node 43.

Figure 5:
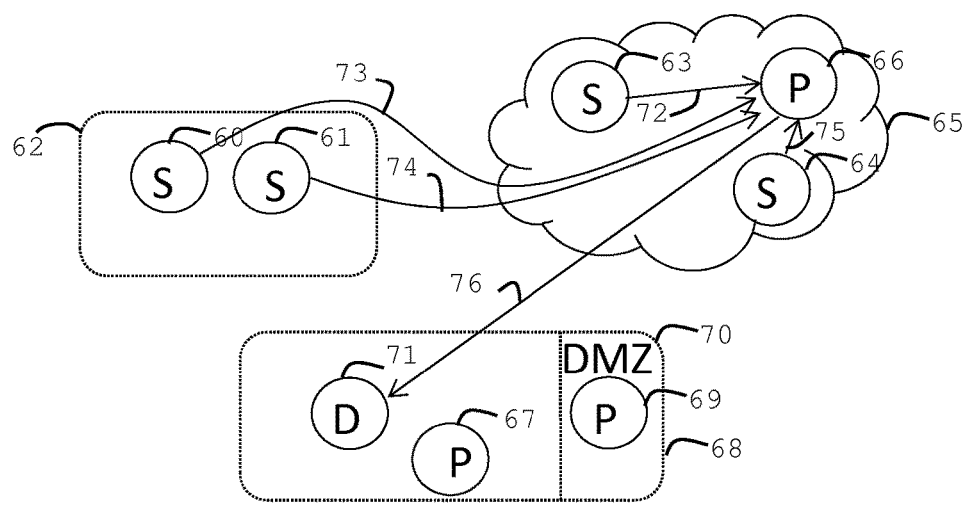
FIG. 5 shows an embodiment of the present invention comprising a processing node for compositing.

FIG. 5 shows an embodiment of the present invention comprising two source nodes 60 and 61 at a local site 62, two source nodes 63 and 64 in the cloud 65, one processing node 66 in the cloud 65, one processing node 67 at the local site 68, one processing node 69 at a perimeter network, or DMZ zone 70 and one destination node 71 at the local site 68 In one embodiment, the streams 72, 73, 74 and 75 from all four source nodes 60, 61, 63 and 64 should be composited to one stream and sent to the destination node 71. The three processing nodes 66, 67 and 69 make possible a variety of solutions. One condition could be that the compositing has to be performed at a processing node whose location is close or optimally spaced with respect to the source nodes. Or the optimal condition could be related to e.g. bandwidth, distance, processing power or any other characteristic. FIG. 5 shows an example where the optimal processing node is 66, which is located in the cloud 65. Thus, the streams 72, 73, 74 and 75 are sent to processing node 66 and composed to one stream 76 which is sent to the destination node 71. In the general case, the processing nodes are able to perform e.g. compositing, transcoding, scaling, re-packaging, relaying, tunnelling or transrating, or any other function. Each node can host one function or any combination of several functions.

Figure 6:
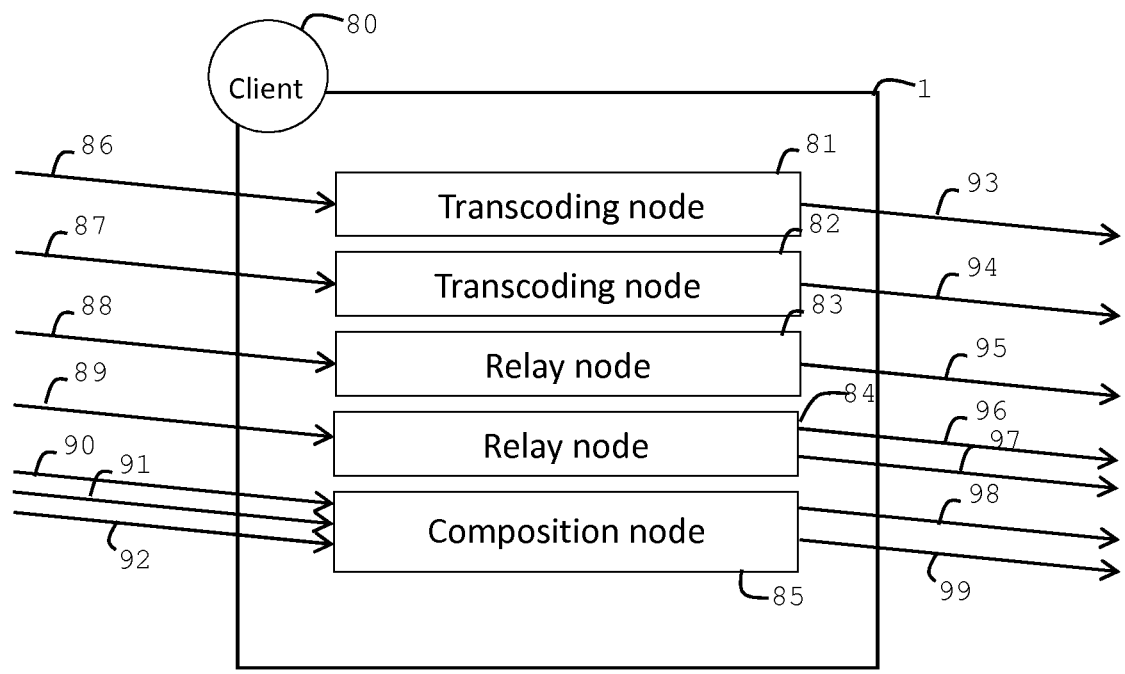
FIG. 6 shows an embodiment of the present invention comprising the capabilities of a processing node.

An example of one embodiment of the present invention where a node comprises several functions is shown in FIG. 6. The processing node P comprises multiple processing pipelines 81 to 85: Pipelines 81 and 82 for transcoding, pipelines 83 and 84 for relaying and pipeline 85 for compositing. The transcoding pipelines 81 and 82 each receives and transmits one stream, 86 and 87 respectively. The relay pipelines 81 and 82 each receives a stream 86 and 87 respectively which is processed and the processed stream 93 is transmitted. The relay pipeline 82 receives a stream 87 which is processed and the processed stream 82 it transmits to two destinations. The compositing pipeline receives three streams which it compositing to one stream and sends this stream to two destinations.

Figure 7:
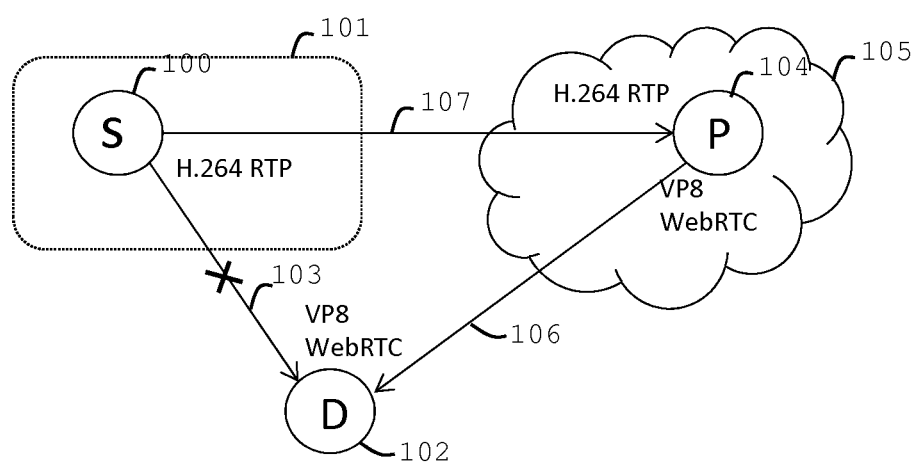
FIG. 7 shows an embodiment of the present invention comprising transcoding.

In one embodiment of the present invention the transmitting and receiving nodes communicate with different protocols, so there is a need for transcoding. FIG. 7 shows an example where node 100 is located in network 101, using H.264 over RTP (Real Time Protocol). H.264 is a video coding format that can be carried by RTP. There is a destination node 102 located outside the network 101 but the direct link 103 is blocked since node 102 runs VP8 over Web RTC (Web Real-Time Communication). VP8 is a video compression format that can be carried by WEB RTC. WEB RTC is an application programming interface that supports browser to browser communication. Node 104 is located in the cloud 105 and comprises a transcoder. The application server (not shown) can then decide to reroute the stream to node via node 104 in link 107. The stream is transcoded to VP8 over WebRTC and can now be sent to the destination node 102 via link 106.

Figure 8:
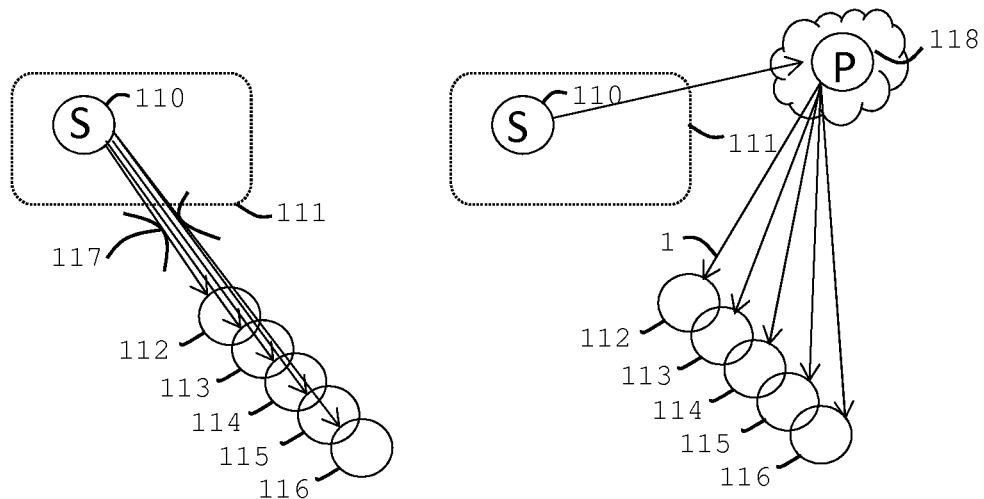
FIG. 8 shows an embodiment of the present invention comprising relocating a high bandwidth demand.

FIG. 8 shows an embodiment where 5 streams are to be sent from one node 110 located in a network 111 to destinations 112-116 located outside 111. This might give rise to a bottle neck 117 near the location of node S. The application server (not shown) can then re-route all streams to processing node 118 located in the cloud 118, which in turn is relaying the streams to their destination nodes 112-116. In this way the high bandwidth demand can be moved to a less sensitive place in the network.

Figure 9:
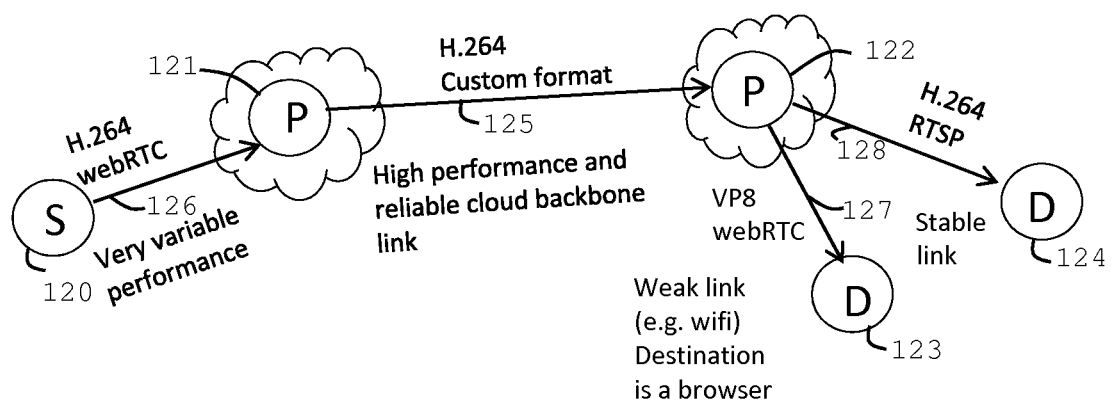
FIG. 9 shows an embodiment of the present invention comprising differing characteristics of different links in the network.

FIG. 9 shows an embodiment of the present invention being a hybrid network comprising a source node 120, two processing nodes 121 and 122, and two destination nodes 123 and 124. One stream will be sent from the source node 120 to the two destination nodes 123 and 124. The different links will have different properties. E.g. the cloud backbone 125 between the processing nodes 121 and 122 is normally fast and reliable while e.g. the link 126 between the source node 120 and the first processing node 121 can exhibit variable performance. Also links 127 and 128 between the processing node 122 and the destination nodes 123 and 124 can be less reliable than 125. By choosing appropriate link settings for each link, the delivery of the stream(s) can be further optimized. For example, if the stream should be sent to multiple destinations but in different codecs and resolutions, it is possible to choose resolution and codec in the intermediate steps, or hops, to minimize bandwidth and processing power (to reduce cost) and/or processing needs (to reduce latency). In another example a link which is more reliable is used so that a protocol with less overhead cost used for error recovery can be chosen. Choosing the link settings can be incorporated in the overall route calculation since it might impact the route (for example, there is a need for a certain processing node that might or might not be available at a certain location).

Figure 10:
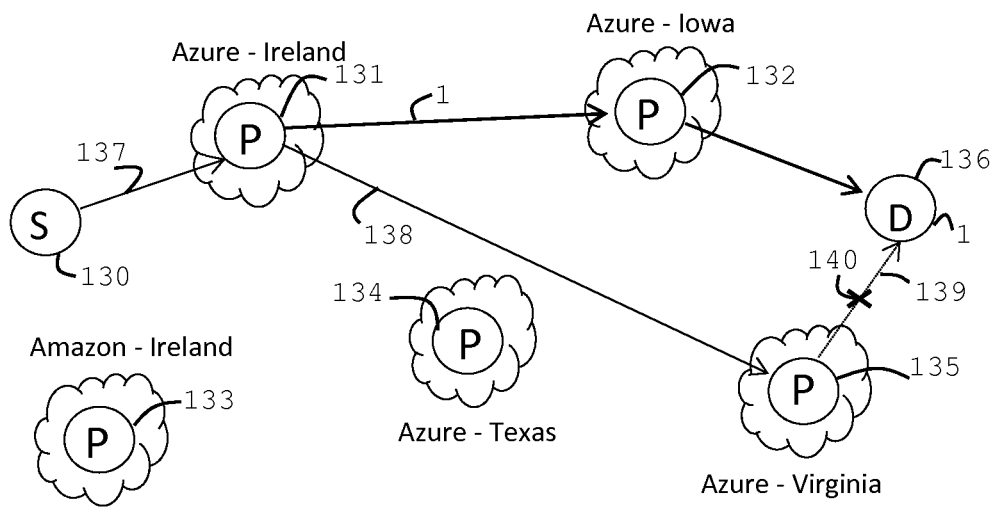
FIG. 10 shows an embodiment of the present invention comprising re-routing after a link breakdown.

FIG. 10 shows an embodiment of the present invention comprising a source node 130, processing nodes 131-135 in different locations and a destination node 136. For a certain data stream, the application server has calculated a route over links 137, 138 and 139. If the link 139 suddenly fails due to an event 140, the application server (not shown) is notified and triggered to re-route the data stream. The application server collects all the capabilities of all nodes between the source node 130 and the destination node 136 and calculates a new route. The calculation can be made from the source node 130 or any other non-replaceable (or "stateful") node, or from the processing node 135 just before the broken link. In this example a route over nodes 131 and 132 was chosen. The present invention can manage live streams where there can be a continuous transmission form the source. Since one node might send out a multiple of streams to several nodes, only the data streams being sent over a link that fails would need to be re-routed while ongoing routing over functioning links can be left undisturbed. The cache time in the nodes is limited to a few milliseconds.

Figure 11:
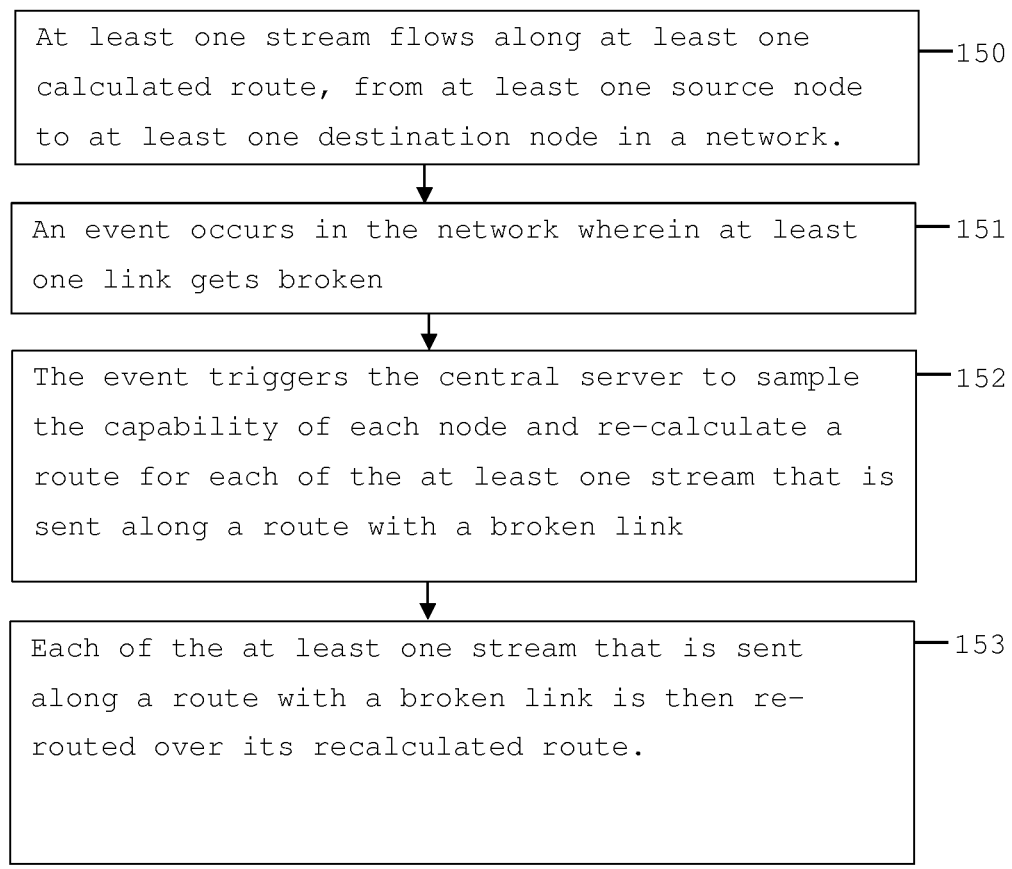
FIG. 11 shows an embodiment of the present invention comprising a flowchart describing re-routing.

The procedure is shown as a flow chart in FIG. 11. In step 150 at least one stream flows along at least one calculated route, from at least one source node to at least one destination node in a network. In step 151, an event occurs in the network wherein at least one link gets broken. In step 152 the event triggers the application server to sample the capability of each node and re-calculate a route for each of the at least one stream that is send along a route with a broken link. Each of the at least one stream that is sent along a route with a broken link is then re-routed over its recalculated route.

Empirical models can be made to predict for example how much of each type of capacity that is needed for certain inputs/outputs. This can be implemented by using abstract descriptions of components and continuously monitoring these components. This "big data" can then be used to model the components. These models can be used to predict the behaviour of components and to detect anomalies and/or problems. For example, on a certain type of machine, a transcoder of type x consumes 10% of the central processing unit for a 1080p video stream.

Figure 12:
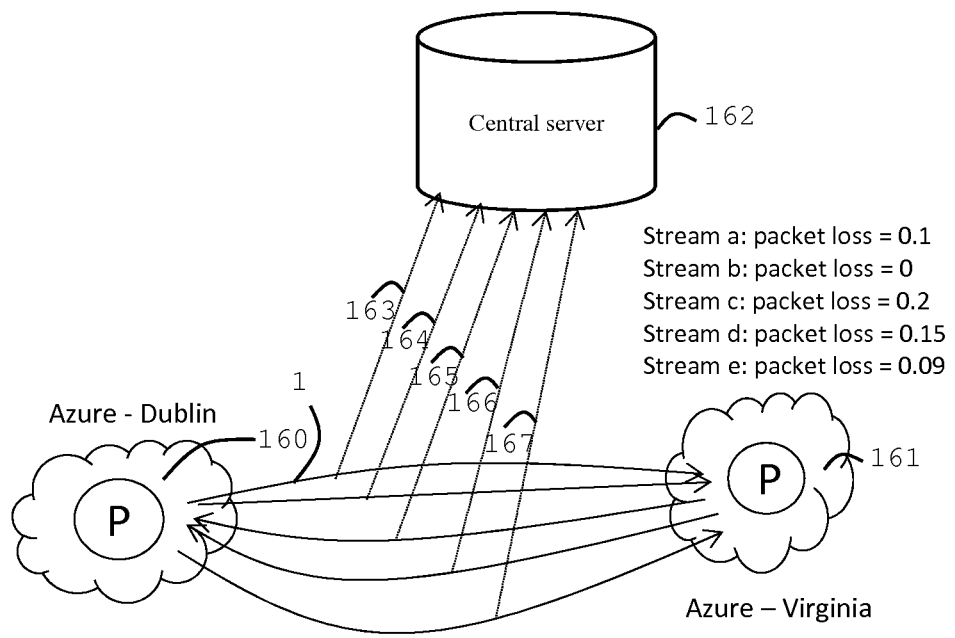
FIG. 12 shows an embodiment of the present invention comprising monitoring of a certain link.

In one embodiment the application server collects the capabilities of certain nodes and links at each point in time. By considering e.g. the actual loads on the network, the server can build a database with statistics of the network behaviour. FIG. 12 shows the logging of packet loss in links between two processing nodes 160 and 161 at a certain point in time. Each link provides its packet loss percentage 163-167 to the application server 162. An example of actual packet losses could be that 163 is 0.1%, 164 is 0%, 165 is 0.2%, 166 is 0.15% and 167 is 0.09%. The application server 162 can then learn that the average loss of packets between node 160 and 161 is ca 0.1%. Such logged data can be stored in databases to be used for predictions.

Figure 13:
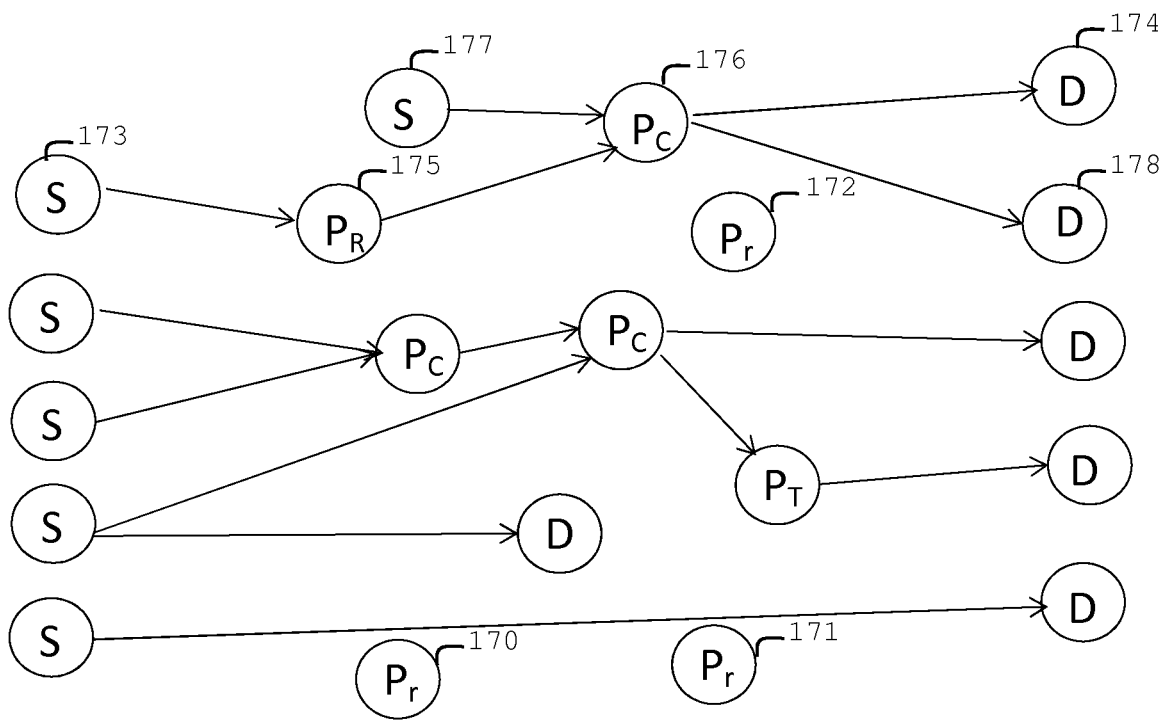
FIG. 13 shows an embodiment of the present invention comprising different nodes in a network.

The predictions described above might show that there is a need for additional nodes or that some nodes can be removed. In one embodiment the application server can add or remove nodes depending on the current need. FIG. 13 shows an example of routes in a network at a certain point in time. The network has source-destination- and processing nodes. There are some nodes 170-172 that are currently not used. The application server can then decide to remove these nodes to reduce cost. Should the demand change at a later point in time so that additional nodes are needed, the application server can add nodes to the network. The network is an overlay network comprising nodes that are implemented as virtual machines that can be added or removed depending on the need. The calculations described in FIG. 14 can be used to calculate predictions to determine the need of amount and type of nodes at various conditions. Such conditions can for example be at a certain time of the day/week or year or the request of sending a certain type of data stream or combination of certain types of data streams. Together with information on the processing power of each node, the actual need of amount of nodes can be predicted.

For a network comprising a source- and destination node and at least one processing node, there can be at least two possible ways for how to route a stream from the source node to the destination node. The number of possible routes increases with the number of available processing nodes between the source node and the destination node. Each node and link in a network can be associated with a cost, for example monetary cost for using a leased network, or it can be cost measured in latency; cost measures other than these are also possible. Thus different routes can be associated with different costs. Since each request comes with specific requirements (need for relaying, compositing, transcoding, etc.) there will be different routes possible for each request and a cost related to each route. It is therefore advantageous to find an optimal route for the request that minimize the cost. This can comprise to minimize e.g. monetary cost, latency cost or cost for number of changes, or any other type cost, or any combination thereof.

The optimization can be performed by just performing all possible calculations using "brute force", however this is often time consuming an inefficient. Alternatively, a Monte Carlo method can be used. Heuristic rules can be used to limit the solution space.

Figure 14:
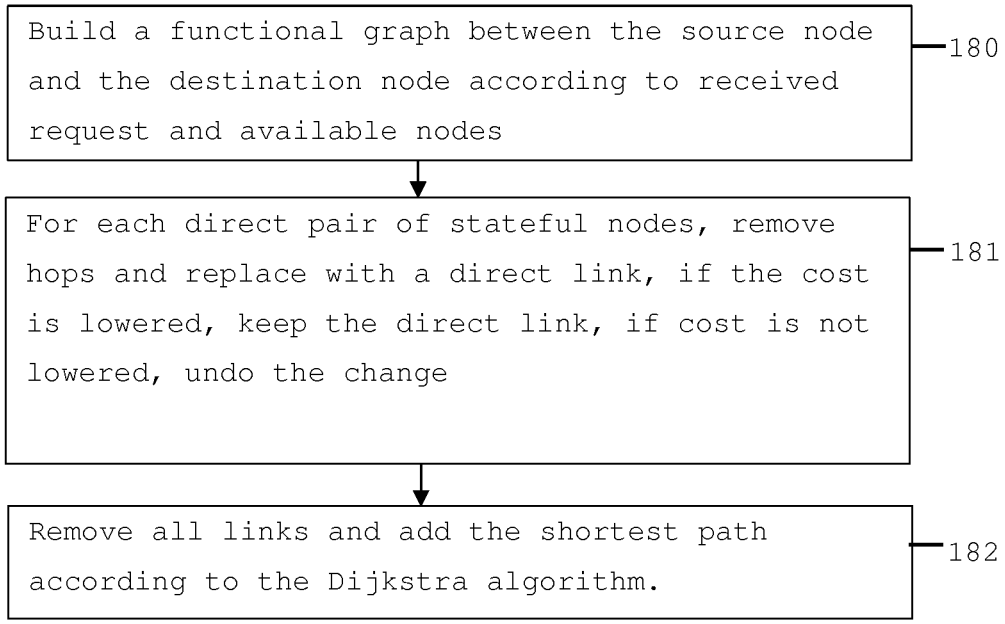
FIG. 14 shows a flow chart of an embodiment of the present invention comprising the application of an heuristic rule.

Embodiments of the present invention include applying heuristic rules according to the following method described in FIG. 14. FIG. 14 shows a flow chart of an embodiment of the present invention where a route is calculated. The process can be performed in two main steps. In step 180 a first step is performed in that a functional graph is built between the source node and the destination node according to the received request and taking into account the available nodes. The graph is built with an ad-hoc approach so that that all requested functions are present but there is not yet any consideration of optimization. Step 180 is a fast step that can be performed within time frames such as 800 ms or even 50 ms, e.g. less than 800 ms down to 30 ms. In a second step 181, an optimization process is started. The step comprises for each direct pair of stateful nodes, that hops are removed and replaced with a direct link, and if the request is still fulfilled (or improved), the direct link is kept, and if the request is not fulfilled, the change is reverted back to the previous state. Step 182 is a second part of the optimization process comprising removing all links between the two nodes and adding the shortest path according to the Dijkstra algorithm (see for example "A Note on Two Problems in Connexion with Graphs", Numerische Mathematik, 1959). This step considers that the links have different costs. Steps 181 and 182 can be performed in a longer time frame, for example several minutes. The process can also work in a multiple of such time frames where it at the end of each time frame provides intermediate results that can be accepted or rejected.

Although the Dijkstra algorithm is preferred other algorithms can be used. The Bellman-Ford algorithm is an algorithm that computes shortest paths from a single source vertex to all of the other vertices in a weighted digraph. It is slower than Dijkstra's algorithm for the same problem, but more versatile, as it is capable of handling graphs in which some of the edge weights are negative numbers. See for example https://en.wikipedia.org/wiki/Bellman%E2%80%93Ford_algorithm As the negative cost or latency is not so useful this algorithm can be used instead of Dijkstra, but may be slower Johnson's algorithm works by using the Bellman-Ford algorithm to compute a transformation of the input graph that removes all negative weights, allowing Dijkstra's algorithm to be used on the transformed graph.

See for example https://en.wikipedia.org/wiki/Johnson%27s_algorithm

Figure 15:
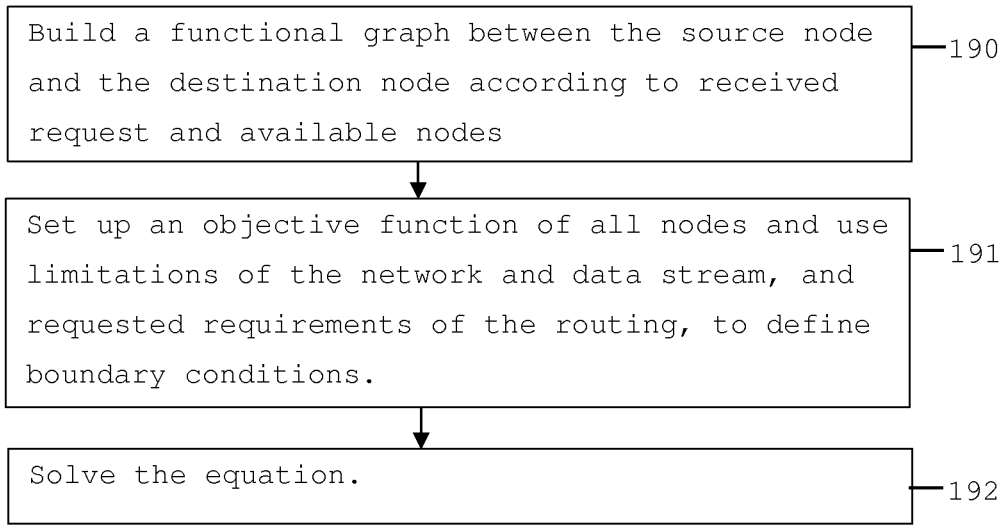
FIG. 15 shows a flow chart of an embodiment of the present invention comprising linear programming

FIG. 15 shows another embodiment of the present invention where step 190 is a first fast step that can be performed within time frames such as 800 ms or even 50 ms e.g. less than 800 ms down to 30 ms. Step 191 starts an optimization process which comprises linear programming. The step 191 comprises setting up an objective function taking into account all nodes in the network and using known limitations of the network and data stream, and requested requirements of the routing, to define boundary conditions. In step 192 the equation is solved, i.e. optimized, with an appropriate solver. Step 191 and 192 can be performed on a longer time frame for example several minutes. The process can also work in a multiple of such time frames whereby at the end of each time frame intermediate results are provided that can be accepted or rejected. The time to reach a solution can depend on the complexity of the ad-hoc network, the solver tool in use and the available computational power.

In order to reduce latency it can be of interest to put in a requirement to limit the number of hop levels of the network. Here follows an example of the case when the number of levels is limited to three; each level can have an arbitrary number of nodes. The network in this example comprises sources, controllers and compositors but the equations can be extended to further types of processing.

Consider the objective function $$M = \sum_i^N \sum_j^{n_i} \left( w_x x_{ij} + w_y \sum_k y_{ijk} + w_z \sum_k z_{ijk} \right) a_{ij} \quad (1)$$

Where $x_{ij}$ represents using the original source, $y_{ijk}$ represents letting the $k^{th}$ compositor do scaling, and $z_{ijk}$ represents letting the $k^{th}$ compositor do scaling and compositing. $x_{ij}$, $y_{ijk}$ and $z_{ijk}$ are binary.

Thus if
$x_{ij}=1$, $x_{ij}$ is the $i^{th}$ controller using the original source (as received) for window $w_{ij}$, and if
$y_{ijk}=1$, $y_{ijk}$ is the $i^{th}$ controller using a scaled source for window $w_{ij}$, and scaling is made by the $k^{th}$ compositor, and if
$z_{ijk}=1$, $z_{ijk}$ is the $i^{th}$ controller using the $k^{th}$ compositor to do scaling and compositing for the complete layout.

The boundary conditions for (1) are $$\sum_k y_{ijk} \leq 1 \quad (2)$$

i.e. only one compositor can perform scaling, or $$\sum_k z_{ik} \leq 1 \quad (3)$$

i.e., the complete composition is made by only one compositor, and $$x_{ij} + \sum_k y_{ijk} + \sum_k z_{ik} \leq 1, \forall i, j \quad (4)$$

i.e. each source is either original or scaled or part of composition, where
i=1 ... N, j=1 ... $n_i$, N is the number of controllers and $n_i$ is the number of windows in the layout of controller i.

$w_x$, $w_y$, $w_z$ are weights that can set a "preference" to do local compositing, scaling or cloud compositing.

For example, if $w_x > w_y > w_z$, any controller will prefer to receive and decode on its own ($w_x$ being largest), if this is not possible, the controller will rely on scaling ($w_y$ being second largest) and last option is that the controller will rely completely on cloud composition ($w_z$ being smallest).

The following boundary conditions consider available bandwidth:

$$b_x \sum_j x_{ij} + b_y \sum_j \sum_k y_{ijk} + b_z \sum_k z_{ik} \leq B_{CTRL}, \forall i \quad (5)$$

-continued $$d_x \sum_j x_{ij} + d_y \sum_j \sum_k y_{ijk} + d_z \sum_k z_{ik} \leq D_{CTRL}, \forall i \quad (6)$$

where
$B_{CTRL}$ is the receiving bandwidth of the controller
$D_{CTRL}$ is the decoding capacity of the controller.
$b_x$ is the bandwidth required to receive an original source
$b_y$ is the bandwidth required to receive a scaled source
$b_z$ is the bandwidth required to receive a composition of one or more sources.

Further, there are boundary conditions for the encoding and decoding capacity:

$$d_x \sum_i \sum_j y_{ijk} + d_x \sum_i z_{ik} n_i \leq D_{COMP}, \forall k \quad (7)$$

$$e_x \sum_i \sum_j y_{ijk} + e_z \sum_i z_{ik} \leq E_{COMP}, \forall k \quad (8)$$

$$b_x \sum_i \sum_j y_{ijk} + b_x \sum_i z_{ik} n_i \leq BRX_{COMP}, \forall k \quad (9)$$

$$b_y \sum_i \sum_j y_{ijk} + b_z \sum_i z_{ik} \leq BTX_{COMP}, \forall k \quad (10)$$

$d_x$, $d_y$, $d_z$ is the decoding capacity required to decode original, scaled or composition of sources.
$b_x$, $b_y$, $b_z$ is bandwidth, as described above.
$D_{comp}$ is the decoding capacity of a compositor
$E_{comp}$ is the encoding capacity of a compositor
$BTX_{comp}$ and $BRX_{comp}$ are the transmitting and receiving bandwidth respectively. It is assumed that all compositors have the same limitations.

The objective is to maximize M in equation (1) subject to the boundary conditions of (2) to (10).

Figure 16:
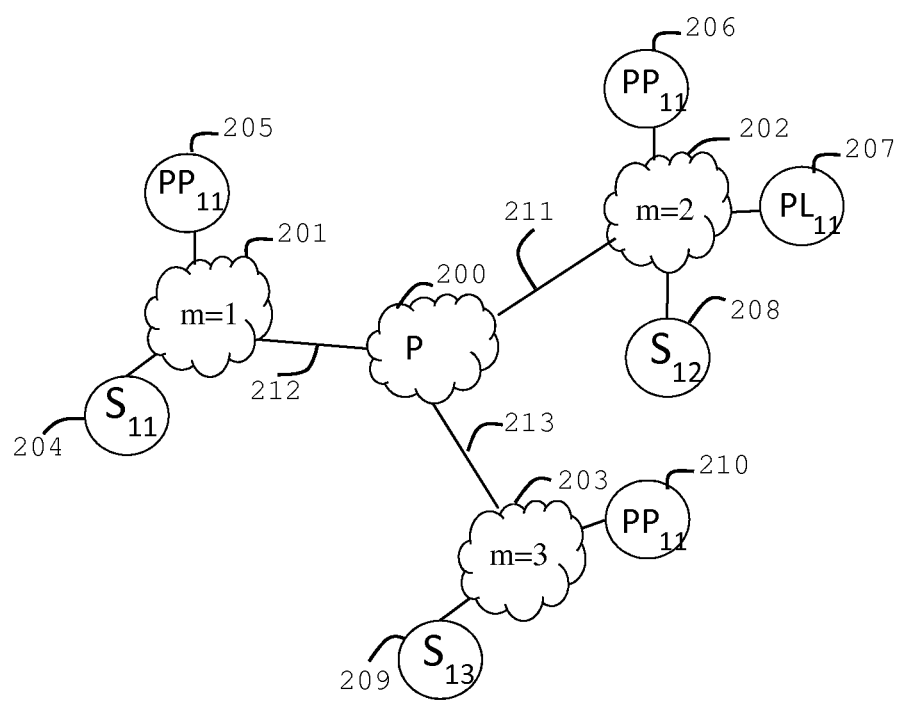
FIG. 16 shows an embodiment of the present invention comprising several network clusters.

In another embodiment the nodes can be located in different networks. FIG. 16 shows a node 200 that can comprise any source or processing function. The node 200 can also be connected to clusters 201, 202 and 203 with high bandwidth connections, e.g. with speeds of 100 Mb/second. Cluster 201 can comprise a source node 204 and a compositor node 205. Cluster 202 can comprise a compositor node 206, a controller node 207 and a source node 208. Cluster 203 can comprise a source node 209 and a compositor node 210. If needed, node 200 can use the resources in clusters 201, 202 and/or 203. The bandwidths between the clusters are 211, 212 and 213 respectively. The source nodes are of the format $S_{lm}$ where l is the source and m is the cluster. The compositor nodes are of the format $PP_{km}$ where k is the compositor and m is the cluster. The controller nodes are of the format $PL_{im}$ where i is the compositor and m is the cluster.

Further we have that $$\sum_m S_{lm} = 1, l = 1 \ldots L, m = 1 \ldots M, \text{ and}$$

$$\sum_m PP_{km} = 1, l = 1 \ldots K, m = 1 \ldots M_i, \text{ and}$$

$$\sum_m CL_{im} = 1, i = 1 \ldots N, m = 1 \ldots M_i.$$

Furthermore, $f_{ijl}=1$ if source $S_l$ is located in window $w_{ij}$ and $f_{ijl}=0$ if source $S_l$ is not located in window $w_{ij}$.

With $$\sum_l f_{ijl} = 1, i = 1 \ldots N, j = 1 \ldots n_i.$$

If cluster m has bandwidth $B_m$, then the following condition should be fulfilled for the outgoing streams $$b_x \sum_i \sum_j \left[\sum_l f_{ijl} S_{lm}\right] \cdot \left[x_{ij}(1 - PL_{im}) + \sum_k (y_{ijk} + z_{ik})(1 - PP_{km})\right] + \quad (11)$$

$$b_y \sum_i \sum_j \sum_k y_{ijk} PP_{km}(1 - PL_{im}) +$$

$$b_z \sum_i \sum_k z_{ik} PP_{km}(1 - PL_{im}) \leq B_m, m = 1 \ldots M,$$

and the following condition should be fulfilled for the incoming stream $$b_x \sum_i \sum_j \left[\sum_l f_{ijl}(1 - S_{lm})\right] \cdot \left[x_{ij} PL_{im} + \sum_k (y_{ijk} + z_{ik}) PP_{km}\right] + \quad (12)$$

$$b_y \sum_i \sum_j \sum_k y_{ijk} PL_{im}(1 - PP_{km}) +$$

$$b_z \sum_i \sum_k z_{ik} PL_{im}(1 - PP_{km}) \leq B_m, m = 1 \ldots M$$

$S_{lm}$, $PL_{im}$, $PP_{km}$ are inputs to the model and can easily be changed. $f_{ijl}$ are retrieved from analysing what each controller wants to display (the requested layout). Equations (11) and (12) model the flux out and in of cluster M where the links to M are limited by bandwidth $B_m$. Adding the constraints (11) and (12) to the model allows to take into account network and limitations. Further, this model can comprise sources and controllers that are mobile since $S_{lm}$ and $PL_{im}$ are variable. The cluster size is arbitrary; it can be one single compositor or source (in which case the parentheses in (11) and/or (12) are cancelled out). The cluster definition allows to model communication over local and remote networks, such as e.g. remote collaboration.

The present invention relates to a variety of digital devices with processing capability such as application servers, database servers etc. Each one of these can include one or more microprocessors, processors, controllers, or central processing unit (CPU) and/or a Graphics Processing Unit (GPU), and can be adapted to carry out their respective functions by being programmed with software, i.e. one or more computer programmes. Any, some or all of these devices may have memory (such as non-transitory computer readable medium, RAM and/or ROM), an operating system, optionally a display such as a fixed format display, data entry devices such as a keyboard, a pointer device such as a "mouse", serial or parallel ports to communicate other devices, network cards and connections to connect to any of the networks.

The software can be embodied in a computer program product adapted to carry out the following functions when the software is loaded onto the respective device or devices and executed on one or more processing engines such as microprocessors, ASIC's, FPGA's etc.:
routing at least one data stream in a telecommunications network having at least one transmitting node providing at least one data stream and at least one receiving node receiving the at least one data stream, and zero or more processing nodes, and at least one link connecting said nodes.

The software can be embodied in a computer program product adapted to carry out the following functions when the software is loaded onto the respective device or devices and executed on one or more processing engines such as microprocessors, ASIC's, FPGA's etc.:
all nodes communicating their capabilities to a system database on a database server, the database server receiving at least one request with at least one condition for sending at least one data stream between two nodes, and for each request, using the capabilities of all nodes and links stored in the central database at the time of receiving the request, to calculate a measure for at least one route between said two nodes, each route comprising at least one transmitting node, at least one receiving node and zero or more processing nodes, and
providing instructions to use only the at least one route having measures compliant with the at least one condition in the request.

The software can be embodied in a computer program product adapted to carry out the following functions when the software is loaded onto the respective device or devices and executed on one or more processing engines such as microprocessors, ASIC's, FPGA's etc.:
calculating an optimal route using at least one heuristic rule or linear programming. For each direct pair of stateful nodes, replace hops between them with a direct link, calculate a route cost, and if the route cost is lowered and the required processing power is still provided, keep the direct link.

The software can be embodied in a computer program product adapted to carry out the following functions when the software is loaded onto the respective device or devices and executed on one or more processing engines such as microprocessors, ASIC's, FPGA's etc.:
For each direct pair of stateful nodes, remove all links between the two nodes and, considering the required processing power, add the shortest path according to one of the Dijkstra algorithm, the Bellman/Ford algorithm; and the Johnson's algorithm.

Software code portions may allow or facilitate, when executed on a processing engine, adding or removing at least one node with processing power, calculate a route cost, if the route cost is lower and the required processing power is still provided, keep the direct link, whereby the route cost is monetary cost or latency cost.

The software can be embodied in a computer program product adapted to carry out the following functions when the software is loaded onto the respective device or devices and executed on one or more processing engines such as microprocessors, ASIC's, FPGA's etc.:
modelling the network with an objective function and use the request to define boundary conditions of the variables in the model, and minimize or maximize the objective function, whereby, the model can comprise variables for at least one processing type and/or at least one window. The variables can be binary and each variable can have an index counter giving each specific component in the network a unique variable.

The software can be embodied in a computer program product adapted to carry out the following functions when the software is loaded onto the respective device or devices and executed on one or more processing engines such as microprocessors, ASIC's, FPGA's etc.:
each processing step in the model is associated with a weight variable.

The model is limited by constraints provided in the request, for example cost and/or latency.

The model is limited by actual properties of the network, for example receiving and transmitting bandwidth and/or encoding and decoding capacity.

The objective function can be minimized or maximized within the limits of variable constraints, whereby the solution can be found by using linear programming.

The software can be embodied in a computer program product adapted to carry out the following functions when the software is loaded onto the respective device or devices and executed on one or more processing engines such as microprocessors, ASIC's, FPGA's etc.:
requesting to send at least two data streams from at least two different transmitting nodes, whereby at least two of the network nodes can use different protocols, and at least two of the network nodes of the calculated route can use different protocols.

The software can be embodied in a computer program product adapted to carry out the following functions when the software is loaded onto the respective device or devices and executed on one or more processing engines such as microprocessors, ASIC's, FPGA's etc.:
Adding or removing network nodes, or a combination of both, between two events in the network.

Sending at least one data stream via a perimeter network or by means of Transmission Control Protocol tunnelling.

Requesting to send at least one data stream from at least one transmitting node to at least one receiving node in a processed format, calculating the optimal location of a processing node in relation to the transmitting node or the receiving node, sending the at least one data stream to the optimal node for processing, and sending the processed data stream to the at least one receiving node, possibly via another processing node, whereby the processing can be compositing, transcoding, scaling, re-packaging, relaying, tunnelling or transrating or any combination thereof.

The software can be embodied in a computer program product adapted to carry out the following functions when the software is loaded onto the respective device or devices and executed on one or more processing engines such as microprocessors, ASIC's, FPGA's etc.:
for each of the at least one calculated route, modifying the settings of the at least one link before sending the at least one data stream along the calculated route.

The at least one single source or central server using the communicated capabilities of nodes to create an empiric model of each node and associated link.

The request condition comprises any of latency, cost, computation time, quality of the data stream, frame rate, accepted loss rate, the priority of a data stream or any combination thereof.

The software can be embodied in a computer program product adapted to carry out the following functions when the software is loaded onto the respective device or devices and executed on one or more processing engines such as microprocessors, ASIC's, FPGA's etc.:
A measure comprises any of latency, cost, computation time, quality of the data stream, frame rate, accepted loss rate, the priority of a data stream or any combination thereof.

For each point in time, there is an optimal route for one measure or for any combination of a multiple of measures.

A pre-set measure is assigned to at least one link of a route.

The single source or central server keeps samplings of capabilities of nodes at different points in time.

Any of the above software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid state memory such as a USB flash memory, a ROM, etc.

The invention claimed is:

1. A method for determining at least one route for at least one data stream in a telecommunications network having nodes comprising at least one transmitting node, having at least one receiving node receiving the at least one data stream, and having processing nodes, and at least one link connecting said nodes, the method comprising the steps of:
   all of said nodes communicating their processing capabilities to at least one single source or central server,
   the at least one single source or central server receiving at least one request with at least one condition for sending at least one data stream between the at least one transmitting node and the at least one receiving node,
   and for each request, using the communicated processing capabilities of all of said nodes and said at least one link stored in the single source or central server at the time of receiving the request, to calculate a measure for at least one route between said at least one transmitting and at least one receiving nodes, said at least one route comprising the at least one transmitting node, the at least one receiving node and one or more of the processing nodes,
   wherein the request is to send the at least one data stream from the at least one transmitting node to the at least one receiving node in a processed format,
   calculating an optimal location of the one or more processing nodes in relation to the at least one transmitting node or the at least one receiving node,
   sending the at least one data stream to the one or more processing nodes at the optimal location for processing into a processed data stream by using any of the communicated processing capabilities, whereby the processing can be any of compositing, transcoding, scaling, re-packaging, or transrating or any combination thereof, and
   sending the processed data stream to the at least one receiving node, and
   providing instructions to use only the at least one route, wherein said at least one route has measures compliant with the at least one condition in the request and said at least one condition comprises actual properties of the telecommunications network.

2. The method according to claim 1 comprising calculating an optimal route using at least one heuristic rule or linear programming.

3. The method according to claim 2, comprising for each direct pair of stateful nodes, replace hops between them with a direct link, calculate a route cost, and if the route cost is lowered and the required processing power is still provided, keep the direct link.

4. The method according to claim 2, comprising for each direct pair of stateful nodes, remove all links between the two nodes and, considering the required processing power, add the shortest path according to one of the Dijkstra algorithm, the Bellman/Ford algorithm; and the Johnson's algorithm.

5. The method according to claim 1 comprising adding or removing at least one node with processing power, calculating a route cost, and if the route cost is lower and the required processing power is still provided, keeping the direct link.

6. The method according to claim 2 comprising modelling the network with an objective function and using the request to define boundary conditions of variables in the model, and minimizing or maximizing the objective function.

7. The method according to claim 6, wherein the variables are binary.

8. The method according to claim 6, wherein the model is limited by constraints provided in the request, or the model is limited by constraints provided in the request being cost and/or latency.

9. The method according to claim 6, wherein the model is limited by actual properties of the network, or the model is limited by actual properties of the network being receiving and transmitting bandwidth and/or encoding and decoding capacity.

10. The method according to claim 6, wherein the objective function is minimized or maximized within the limits of variable constraints.

11. The method according to claim 6, wherein a solution is found by using linear programming.

12. The method according to claim 1 comprising requesting to send at least two data streams from at least two different transmitting nodes.

13. The method according to claim 1 comprising at least two of the network nodes of the calculated route using different protocols.

14. The method according to claim 1 comprising adding or removing network nodes, or a combination of both, between two events in the network.

15. The method according to claim 1 comprising for each of the at least one calculated route, modifying the settings of the at least one link before sending the at least one data stream along the calculated route.

16. The method including re-routing a data stream comprising the steps of the network being submitted to an event which triggers engagement of the method of claim 1.

17. A system for determining at least one route for at least one data stream in a first telecommunications network comprising:
   said first telecommunications network having nodes comprising at least one transmitting node, at least one receiving node for receiving the at least one data stream, and one or more processing nodes;
   at least one link connecting said nodes;
   at least one single source or central server connected to all of said nodes, via clients, over a second network, wherein all of said nodes are configured to communicate their processing capabilities to the at least one single source or central server,
   wherein for each point in time, a processing capability of each node of said nodes and said at least one link is stored on the single source or central server, so that for each point in time, a measure is calculated for the at least one route through the network from the processing capability of each node of said nodes and said at least one link belonging to said at least one route,
   wherein the system is adapted to receive a request to send the at least one data stream from the at least one transmitting node to the at least one receiving node in a processed format with at least one condition for sending the at least one data stream, said at least one condition comprises actual properties of the telecommunications network, calculating an optimal location of a processing node of the one or more processing nodes in relation to the at least transmitting node or the at least one receiving node, sending the at least one data stream to the processing node at the optimal location for processing into a processed data stream by using any of the communicated processing capabilities, whereby the processing can be any of compositing, transcoding, scaling, re-packaging, or transrating or any combination thereof, and sending the processed data stream to the at least one receiving node, and to provide instructions to use only the at least one route, wherein the at least one route has measures compliant with the at least one condition in the request.

18. The system according to claim 17, wherein a measure comprises any of latency, cost, computation time, quality of the data stream, frame rate, accepted loss rate, the priority of a data stream or any combination thereof.

19. A non-transitory signal storage medium storing a computer program product which when executed on a processing engine carries out the method of claim 1.

20. The method according to claim 1, wherein said measures comprise said calculated measure for at least one route between said at least one transmitting node and at least one receiving nodes.

21. The method according to claim 1, wherein the at least one data stream comprises at least one data selected from the group consisting of text, video, audio, metadata files or any digitized data, packets, and frames.

* * * * *